United States Patent [19]
Godot

[11] 3,877,182
[45] Apr. 15, 1975

[54] DEVICE FOR CLAMPING THE TEMPLET AND THE WORKPIECE IN AN OUTLINE REPRODUCTION MACHINE

[75] Inventor: Jean-Marie Godot, Brunoy, France

[73] Assignee: Essilor International (Compagnie Generale d'Optique), Joinville Le Pont, France

[22] Filed: Oct. 9, 1974

[21] Appl. No.: 513,381

[30] Foreign Application Priority Data
Oct. 9, 1973 France .............................. 73.36001

[52] U.S. Cl. ............................ 51/217 T; 51/237 R
[51] Int. Cl. ............................................ B24d 41/06
[58] Field of Search ........ 51/101 R, 101 LG, 217 T, 51/217 R, 237 R; 269/40, 227, 153, 154; 81/77

[56] References Cited
UNITED STATES PATENTS

| | | | |
|---|---|---|---|
| 907,001 | 12/1908 | Brinser | 81/77 |
| 2,612,734 | 10/1952 | Taig | 51/101 LG |
| 3,738,065 | 6/1973 | Tagnon | 51/101 LG |

Primary Examiner—Al Lawrence Smith
Assistant Examiner—Nicholas P. Godici

[57] ABSTRACT

This device for clamping a templet and a workpiece to be outlined on the opposite ends, respectively, of the rotary spindle of an outline reproduction machine comprises a pair of clamping jaws axially movable towards and away from the relevant ends of said spindle, one jaw being constantly urged by spring means against the adjacent spindle end and the other jaw, in its rest position, being somewhat spaced from the opposite end of said spindle, single clamping control means for controlling the movements of said pair of jaws, and means for locking said clamping control means in the desired position after clamping said templet and workpiece against the opposite ends of said spindle. This invention is applicable more particularly but not exclusively to machines for trimming and bevelling ophthalmic lenses.

3 Claims, 6 Drawing Figures

DEVICE FOR CLAMPING THE TEMPLET AND THE WORKPIECE IN AN OUTLINE REPRODUCTION MACHINE

BACKGROUND OF THE INVENTION

1. Field of the Invention

The present invention relates in general to outline reproduction machines of the type comprising a rotatably driven spindle adapted to receive at its opposite ends a templet and a workpiece to be outlined or shaped in conformity with the templet contour and, more particularly, to a device adapted to clamp the templet and the workpiece to be outlined or shaped to the opposite ends, respectively, of the rotary spindle of a machine of this character.

The present invention is applicable more particularly but not exclusively to machines for trimming and bevelling ophthalmic lenses. In the following disclosure, the invention will be described with specific reference to such trimming and bevelling machines, it being understood however that it is applicable to any outline reproduction machine in which the templet or model and the workpiece to be outlined are mounted at the opposite ends, respectively, of a rotary spindle.

2. Description of the prior Art

It is current practice in known machines of this type to provide two clamping jaws, one for the templet and another for the workpiece or lens to be outlined or shaped, each jaw being axially movable towards and away from a relevant end of the rotary spindle of the machine. Moreover, to control the movements of the clamping jaws, control means are provided as a rule for each clamping jaw; the two clamping control means are each disposed in the vicinity of the clamping jaw associated therewith, at the opposite ends of the rotary spindle of the machine. Under these conditions, to clamp a templet and a workpiece to be outlined or shaped to the opposite ends of the rotary spindle, respectively, the operator of the machine must firstly actuate in a first direction one of the two control means of the clamping assembly, for instance the one associated with the templet clamping jaw, to permit the proper positioning of the templet on the relevant end of the rotary spindle (after having removed, if necessary, the templet used in the preceding operation), whereafter the operator actuates in the opposite direction the same control means for clamping the templet to said end. Then, the operator must move to the opposite end of the machine spindle to actuate in a first direction the other clamping control means associated for example to the jaw provided for clamping the workpiece to be outlined or shaped, in order to open this jaw and thus permit the positioning of the workpiece on the corresponding end of the rotary spindle (after having removed the previously shaped workpiece, if necessary). Then, he must actuate these other clamping control means in the opposite direction (with respect to said first direction) for clamping the workpiece to said end of the rotary spindle. It will be noted that the operator of the machine must perform a relatively considerable number of operations for clamping on the one hand the templet or model and on the other hand the workpiece to be outlined on the opposite ends of the rotary spindle of the machine.

In other machines of the same type, no clamping control means are associated with the templet clamping jaw, but this specific jaw is constantly urged by a resilient force, for example a spring force, in the axial direction towards the adjacent ends of the rotary spindle of the machine. Although these last-mentioned machines are constructionally simpler than the machines described in the foregoing which comprise two clamping control means, they do not simplify the operations to be performed by the operator of the machine for clamping a templet or model and a workpiece to be outlined, respectively, to the opposite ends of the rotary spindle of the machine. Moreover, the operator is compelled to exert a certain physical effort for overcoming the spring force in order to open the clamping jaw and to permit the proper positioning of the templet on the corresponding end of the rotary spindle.

SUMMARY OF THE INVENTION

It is the essential object of this invention to avoid these inconveniences by providing a device adapted to clamp a templet and a piece to be outlined to the opposite ends, respectively, of the rotary spindle of an outline reproduction machine, this device being constructionally very simple and requiring a minimum number of operations for its actuation, without the hitherto customary necessity for the operator of the machine to move from one to the other end of the rotary spindle of this machine.

To this end, the invention provides a clamping device comprising a pair of clamping jaws each axially movable towards and away from a relevant end of the rotary spindle, a first jaw of the pair being urged by a resilient spring towards the adjacent end of the spindle, while the other jaw being, in its rest position, somewhat spaced from the opposite end of the spindle, and clamping control means operatively connected to said clamping jaws for controlling the movements thereof, characterized in that said clamping control means are single for both jaws and adapted to move the first jaw away from the adjacent end of the spindle against the force of said spring without moving the other jaw, when said means are actuated in a first direction from a rest position, and adapted to move said other jaw towards the relevant end of said spindle and said first jaw towards the relevant end of said spindle, if this movement has not already been caused by the spring action, when said means are actuated in another direction opposite to said first direction, and that locking means are provided for holding said clamping control means in the desired position in which they are set after their actuation in said other direction.

With this device, due to the provision of a single clamping control for the two jaws, the steps required for positioning and clamping the templet and the workpiece to the two opposite ends respectively of the rotary spindle of the machine are greatly simplified. Moreover, as will be seen presently, with the clamping device of this invention the clamping forces exerted on the opposite ends, respectively, of the rotary spindle are equal so that, after said templet and workpiece have been clamped, the spindle is not subjected to any residual axial force. On the other hand, in hitherto known machines, of the general type described hereinabove the clamping force exerted on the spindle at the workpiece end thereof is constantly greater than the clamping force exerted on the spindle at the templet end thereof. Under these conditions, in these prior art constructions after clamping the templet and workpiece to be outlined to the rotary spindle, the latter is subjected to an axial residual force directed from the workpiece end to the templet end of the spindle, so that axial-thrust ball bearings must be provided to prevent axial movement of the rotary spindle, in addition to the support bearings usually provided therefor. The clamping device according to this invention will thus afford a substantial simplification in the construction and operation of the machine, while reducing appreciably the cost thereof, since the aforesaid axial-thrust ball bearings can be dispensed with.

A detailed description of a typical embodiment of the device constituting the subject-matter of this invention will now be described by way of example with reference to the accompanying drawings, in which:

DESCRIPTION OF THE PREFERRED EMBODIMENT

Figure 1:
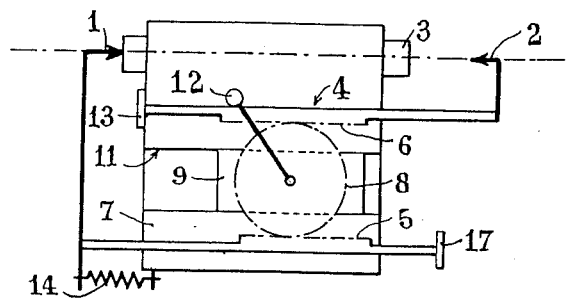
FIGS. 1, 2 and 3 are diagrammatic elevational views illustrating the basic principle of the clamping device of this invention, the main component elements of the device being shown in various operative positions.
Figure 2:
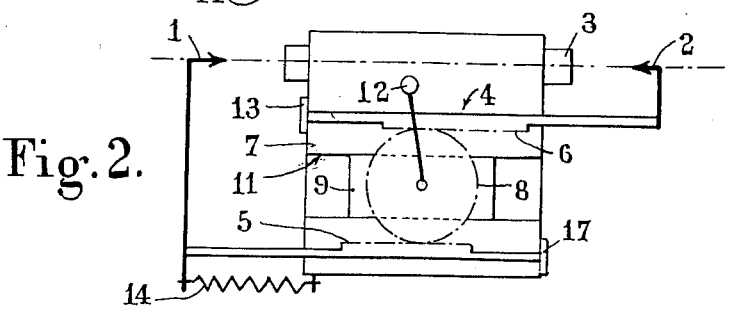
Figure 3:
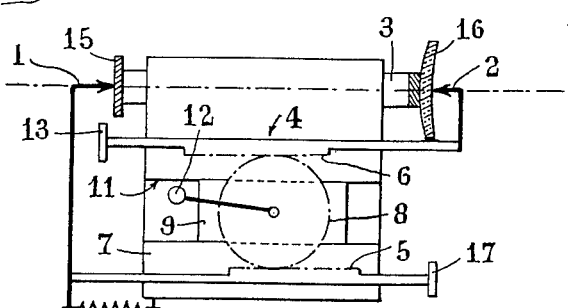

The clamping device illustrated in FIGS. 1 to 3 of the drawings comprises essentially a pair of clamping jaws 1 and 2 each adapted to move axially towards and away from a relevant end of the rotary spindle 3 of an outline re-production machine, together with clamping control means 4 operatively connected to said clamping jaws 1 and 2 for controlling the movements thereof. The clamping jaw 1 is adapted, for example, to clamp a templet to the adjacent end of the rotary spindle 3, and the other clamping jaw 2 is adapted, for example, to clamp a workpiece to be outlined or shaped according to the templet contour to the adjacent end of spindle 3.

The clamping control means 4 comprise a pair of racks 5, 6 rigidly connected to the corresponding jaws 1 and 2, respectively, said racks 5, 6 being parallel to each other and to the axis of said rotary spindle 3. Furthermore, the jaws 5, 6 are adapted to slide in their axial directions in a frame structure 7 formed integrally or rigid with the outline reproduction machine, the spindle 3 being also rotatably mounted in said frame structure 7. The sets of teeth of the pair of parallel racks 5, 6 face each other and a toothed pinion 8 is disposed between, and engages, the two sets of rack teeth, as shown. The toothed pinion 8 is rotatably mounted in a slide 9 adapted to travel in a direction parallel to the longitudinal direction of said racks 5, 6, due to the provision of slideways 11 formed in said frame structure 7. A control lever 12 is rigidly connected to pinion 8 to permit the manual actuation thereof in one or the other direction. A movable stop member 13 rigid with rack 6 is adapted to engage a fixed abutment consisting of the left-hand end face of the frame structure as shown in FIGS. 1 and 2. Moreover, a spring 14 is provided for constantly urging the clamping jaw 1 towards the relevant end of the rotary spindle 3. This spring 14 needs not be particularly strong, it is only necessary that its force be slightly greater than the sum of the friction forces developed in the above-described control mechanism. Finally, means (not shown in FIGS. 1-3) are provided for blocking the above-described clamping control means, and more particularly its control lever 12, in a desired position.

Now the operation of the clamping device of this invention will be described in detail. Firstly, it will be assumed that the clamping jaws 1 and 2 are intended for clamping the former a templet 15 and the latter a workpiece 16, for example an ophthalmic lens, to be outlined or shaped according to the contour of templet 15 at the opposite ends of spindle 3. In the rest condition the various component elements of the clamping device are in the position shown in FIG. 1. In this rest position the clamping jaw 1 engages the adjacent end of spindle 3 and the other clamping jaw 2 is somewhat spaced from the adjacent end of spindle 3, with the movable stop 13 engaging the stationary abutment consisting of the left-hand side of the frame 7 of the machine. With this clamping device, the first step consists in properly positioning the templet 15. This can be done by pivoting the lever 12 in the clockwise direction as shown in FIG. 2. This pivotal movement of lever 12 causes the pinion 8 to roll on rack 6, the latter remaining stationary since the movable stop 13 bears against the left-hand side of frame 7, as shown. The rolling movement of pinion 8 on rack 6 is permitted by the presence of the slide 9 moving to the left in slideways 11. At the same time, the pinion 8 moves the opposite rack 5 to the left (as seen in FIG. 2) against the force of return spring 14, so as to move the clamping jaw 1 away from the adjacent end of spindle 3. An abutment 17 rigid with said rack 5 is provided for limiting the permissible movement of this rack 5 to a reasonable value, that is, just beyond the distance necessary for positioning the templet 15 between the clamping jaw 1 and the adjacent end of rotary spindle 3. The operator of the machine may then position the templet 15 as mentioned hereinabove, and then simply releasing the control lever 12 will cause the latter to resume its inoperative position in which the clamping jaw 1 presses the templet 15 aginst the adjacent end of spindle 3, due to the elastic force of return spring 14. The component elements of the clamping device are then substantially in their initial position shown in FIG. 1, with, in addition, the templet 15 interposed between the clamping jaw 1 and the adjacent end of spindle 3. The operator of the machine can then insert the workpiece or lens 16 on the other end of spindle 3 and clamp the workpiece or lens 16 against this other end by means of the other clamping jaw 2 by pivoting the control lever 12 in the counter-clockwise direction, as shown in FIG. 3. In fact, this pivotal movement will cause the pinion 8 to rotate on rack 5, but the latter remains stationary, due to the bearing engagement between the clamping jaw 1 and the templet 15. As in the preceding step, this movement of pinion 8 is permitted by the slide 9 moving to the left in its slideway 11. At the same time, the pinion 8 moves the rack 6 also to the left so as to press the clamping jaw 2 against the workpiece 16. Under these conditions, the operator of the machine has only to actuate the locking means (not shown) for firmly holding the complete control mechanism in the position illustrated in FIG. 3.

It will be noted that the effort exerted by the operator on the control lever 12 for rotating same counterclockwise, in order to press the clamping jaw 2 against the workpiece 16, is also transmitted through the rack 5 to the first clamping jaw 1 in order to press same against the templet 15, and that the forces applied by the two clamping jaws 1 and 2 against the templet 15 and workpiece 16 respectively are equal. The resultant of these two forces is therefore zero, whereby, finally, the spindle 3 is not subjected to any axial thrust or force whatsoever once the templet 15 and workpiece 16 have been clamped against the opposite ends of said spindle.

Figure 4:
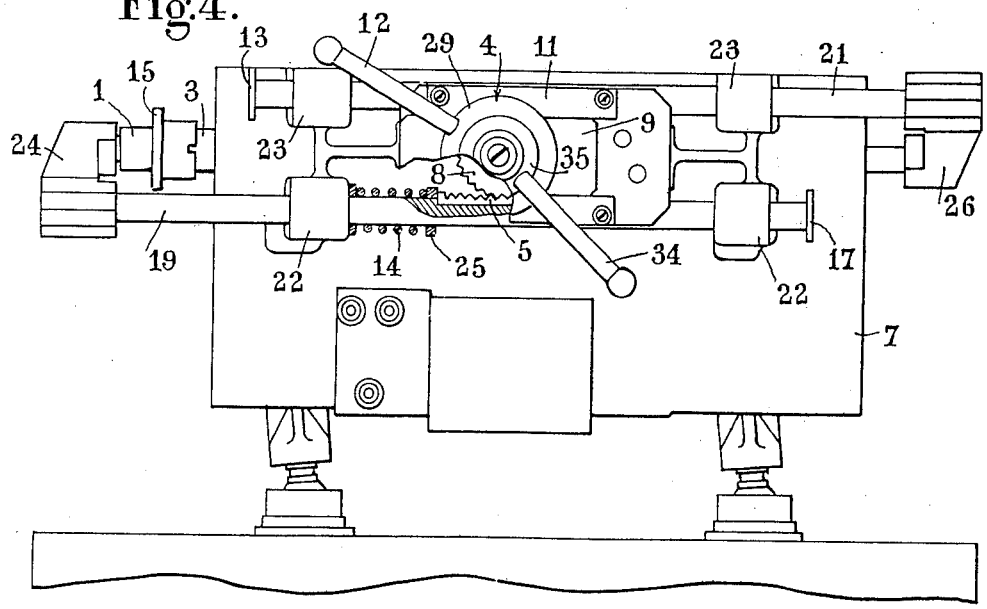
FIG. 4 is a fragmentary elevational view with parts broken away, illustrating an outline reproduction machine incorporating a clamping device according to this invention.
Figure 5:
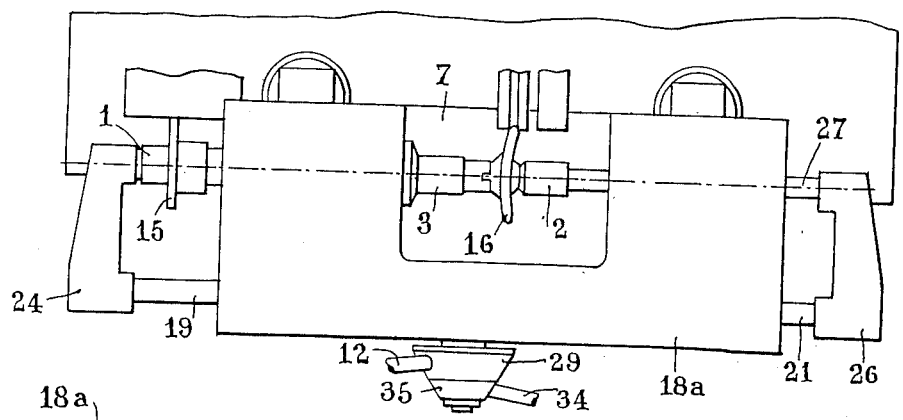
FIG. 5 is a plan view of the machine shown in FIG. 4.
Figure 6:
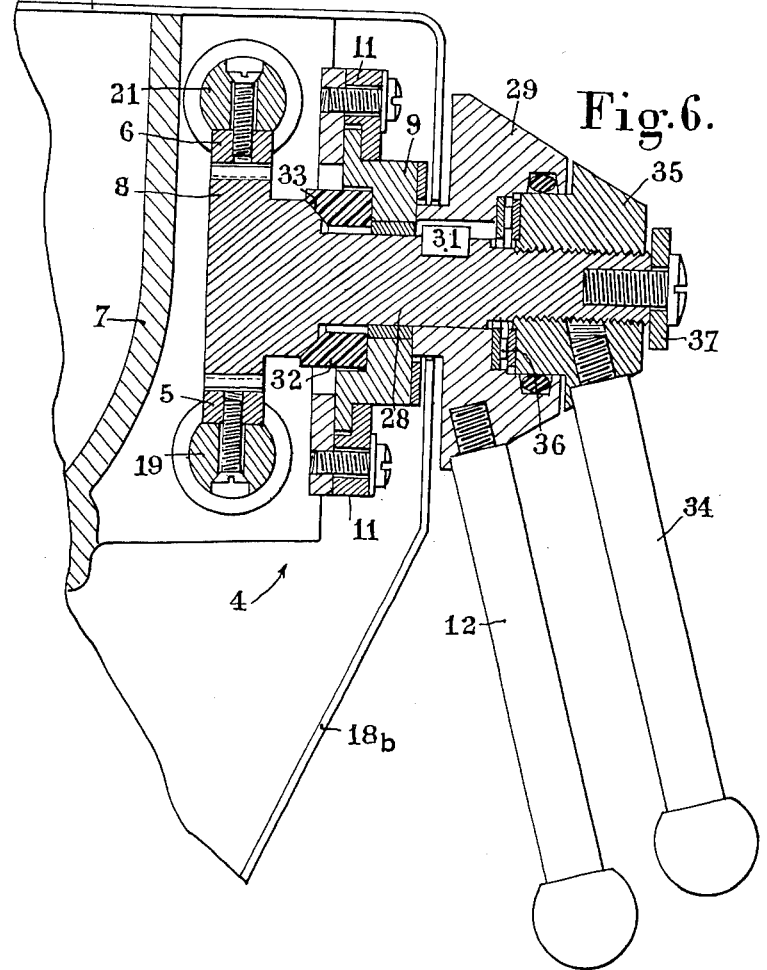
FIG. 6 is a fragmentary cross-sectional view showing on a larger scale a detail of the clamping device of this invention which is incorporated in the machine illustrated in FIGS. 4 and 5.

FIGS. 4 to 6 illustrate a practical embodiment of the present invention as applied by way of example to a machine for trimming and bevelling ophthalmic lenses, more particularly to the machine disclosed in the co-pending patent application filed by the same Applicant and entitled: "Machine for trimming and bevelling ophthalmic lenses". However, it will be readily understood by those conversant with the art that the invention would be applied as well to any other type of lens trimming and bevelling machines and, as a rule, to any other outline reproduction machine of the type wherein a templet and a workpiece to be outlined or shaped must be clamped on the two opposite ends, respectively, of a rotary spindle.

In FIGS. 4 and 6, similar component elements performing the same functions as those illustrated in FIGS. 1 to 3 of this application are designated by the same reference numerals. In FIG. 4 of the attached drawings the casing 18a, 18b (FIGS. 5 and 6) normally housing the frame structure 7 is removed in order to show certain component elements of the control mechanism.

As clearly shown in these Figures, the racks 5 and 6 are secured to a pair of cylindrical bars 19 and 21, respectively, each slidably mounted in a pair of bearings fitted in bosses 22 or 23 formed integrally with said frame 7, for example by casting or moulding. At one end of the cylindrical bar 19 a radial arm 24 supporting the clamping jaw 1 is secured, and secured to the opposite end of this bar 19 is a stop member 17 adapted to engage the right-hand end of bearing boss 22 registering therewith and acting as a fixed abutment member. A coil compression spring 14 is compressed between one end of one of said pair of bearing bosses 22, 23 and a washer 25 reacting in the axial direction against one end of rack 5. Whereas in FIGS. 1 to 3 the spring 14 is a tension spring, in the case of FIGS. 4 to 6 a compression spring is fitted, for constructional reasons obvious to those conversant with the art. Likewise, the cylindrical bar 21 has secured to one end a radial arm 26 carrying the other clamping jaw through the medium of a rod 27 parallel to said bar 21. At its opposite end this bar 21 is provided with an integral movable stop member 13 adapted to engage the left-hand end of bearing boss 23 registering therewith and acting as a fixed abutment member.

As shown more particularly in FIG. 6, the pinion 8 is carried by one end of a shaft 28 rotatably mounted in slide 9. At its opposite end the shaft 28 carries a ring 29 rotatably solid with said shaft 28 due to the provision of a key 31. Secured to this ring is a control lever 12 for controlling the rotation of pinion 8 in one or the other direction.

Means are provided for locking the above-described control mechanism in the desired position when the templet 15 and workpiece 16 have been clamped to the opposite ends of spindle 3. These locking means comprise a friction ring, washer or like annular brake lining 32 carried by the slide 9 and having an operative face preferably of tapered configuration registering with an annular shoulder 33 also preferably tapered with the same angle as said lining 32 and formed on the pinion side of shaft 28. In addition, the locking means comprise a control member mounted to the opposite end of shaft 28 and adapted to move this shaft in either axial directions in order to cause its shoulder 33 to either engage and press the brake lining 32, or move away therefrom. In the example illustrated, this control member comprises essentially a control lever 34 secured to the outer periphery of a ring 35 formed with a tapped central bore. The end of shaft 28 which is opposite to the pinion side is screw-threaded and engages said tapped bore of ring 35. The ring 35 is caused to penetrate partially into an annular cavity formed in ring 29 and bears axially against the bottom of this cavity through a thrust bearing 36. A washer 37 is secured to the outer, screw-threaded end of shaft 28, so that the ring 35 is retained in position with a certain play between this washer 37 and the thrust bearing 36. With this arrangement, when the lever 34 is rotated in one direction, the ring 35 will bear against the thrust bearing 36 so that, due to the presence of said screw-threaded portion, the shaft 28 will be shifted axially to the right, as seen in FIG. 6, to press the shoulder 33 against the brake lining 32 and thus lock the control mechanism in the desired position. In contrast thereto, when the lever 34 is pivoted in the other direction, the shoulder 33 will tend to move the shoulder 33 away from the lining 32.

As those conversant with the art will readily infer from the above description, it is obvious that the present invention provides an efficient single clamping device particularly simple to construct and operate. Moreover, by properly selecting the pinion-and-rack transmission ratio, it is possible to obtain an assembly such that pivoting the control lever 12 even through a relatively small total angular amplitude (say, less than 90°) is sufficient for positioning the templet and the workpiece to be outlined or shaped, and also clamping these elements to the opposite ends of the rotary spindle. Under these conditions, the time required for performing these positioning and clamping operations is reduced considerably.

Of course, the specific form of embodiment of the invention which is described hereinabove with reference to the accompanying drawings is given by way of example, not of limitation. Therefore, many modifications and changes may be brought thereto without departing from the basic principle of the invention as set forth in the appended claims.

What I claim is:

1. A device for clamping a templet and a workpiece to be outlined, on the opposite ends, respectively, of a rotary spindle of an outline reproduction machine, comprising two clamping jaws each axially movable towards and away from a relevant end of said spindle, a spring for resiliently urging a first one of said jaws towards the adjacent end of said spindle, the other jaw in its rest position being somewhat spaced from the other end of said spindle, single control means operatively connected to said pair of clamping jaws for controlling the movements thereof, said control means moving said first jaw away from the adjacent end of said spindle against the return force of said spring without moving the other jaw when said control means are actuated in a first direction from a rest position, and moving said other jaw towards the adjacent end of said spindle and said first jaw towards the adjacent end of said spindle if said first jaw has not already been so moved by the action of said spring when said means are actuated in the direction opposite to said first direction, and locking means for holding said control means in the position in which they have been set after having been actuated in said opposite direction.

2. A device as set forth in claim 1, wherein said control means comprise first and second racks extending parallel to each other and to said spindle which are adapted to slide axially and are rigidly connected to said first and second jaws, respectively, the sets of teeth of said racks facing each other, a pinion between said racks and in constant meshing engagement with the teeth thereof, a slide on which said pinion is rotatably mounted and adapted to slide in a direction parallel to the longitudinal direction of said racks, a movable stop member rigid with the second rack and engaging a fixed abutment member when said control means are in said rest position, and a control lever connected to said pinion for manually controlling the rotation thereof in either direction from a position corresponding to said rest position of said control means.

3. Device as set forth in claim 2, wherein said pinion is secured to one end of a shaft axially movable and rotatably mounted in said slide and having said control lever mounted on its opposite end, said locking means comprising an annular brake lining carried by said slide and having an operative face registering with an annular shoulder formed on said shaft, and a locking control memeber also mounted on said opposite end of said shaft and adapted to actuate said shaft axially in either direction for selectively applying said annular shoulder against said brake lining and removing said shoulder therefrom.

* * * * *